US010435087B2

(12) United States Patent
Hardin et al.

(10) Patent No.: US 10,435,087 B2
(45) Date of Patent: Oct. 8, 2019

(54) PERSONAL TRANSPORTATION VEHICLE

(71) Applicants: Kenneth Hardin, Corpus Christi, TX (US); Chase Hardin, Corpus Christi, TX (US)

(72) Inventors: Kenneth Hardin, Corpus Christi, TX (US); Chase Hardin, Corpus Christi, TX (US)

(*) Notice: Subject to any disclaimer, the term of this patent is extended or adjusted under 35 U.S.C. 154(b) by 15 days.

(21) Appl. No.: 15/927,207

(22) Filed: Mar. 21, 2018

(65) Prior Publication Data
US 2018/0273117 A1 Sep. 27, 2018

Related U.S. Application Data

(60) Provisional application No. 62/474,335, filed on Mar. 21, 2017.

(51) Int. Cl.
| | |
|---|---|
| *G05D 1/08* | (2006.01) |
| *B62D 5/04* | (2006.01) |
| *B62D 57/00* | (2006.01) |
| *B62D 37/06* | (2006.01) |
| *H04W 48/16* | (2009.01) |
| *H04W 60/00* | (2009.01) |
| *B62D 63/02* | (2006.01) |
| *H01F 7/06* | (2006.01) |
| *B60K 8/00* | (2006.01) |
| *H01F 7/14* | (2006.01) |

(52) U.S. Cl.
CPC ............ *B62D 37/06* (2013.01); *B62D 63/02* (2013.01); *H04W 48/16* (2013.01); *H04W 60/00* (2013.01); *B60K 8/00* (2013.01); *B60Y 2200/11* (2013.01); *H01F 7/06* (2013.01); *H01F 7/145* (2013.01)

(58) Field of Classification Search
CPC ........ G05D 1/0891; B62D 5/04; B62D 57/00; B62D 37/06
See application file for complete search history.

(56) References Cited

U.S. PATENT DOCUMENTS

| | | | |
|---|---|---|---|
| 970,616 | A | 9/1910 | Edison |
| 4,725,024 | A | 2/1988 | Vorlicek |
| 4,961,551 | A | 10/1990 | Rosen |
| 8,727,266 | B2 | 5/2014 | Cardozo |
| 9,817,406 | B1* | 11/2017 | Thielman ............. G05D 1/0891 |
| 2006/0163434 | A1 | 7/2006 | Patel et al. |
| 2010/0048359 | A1* | 2/2010 | Chuang .................. A63B 21/22 482/44 |
| 2013/0153709 | A1 | 6/2013 | Sousa |

* cited by examiner

*Primary Examiner* — Bickey Dhakal
*Assistant Examiner* — Cortez M Cook
(74) *Attorney, Agent, or Firm* — Argus Intellectual Enterprise; Daniel Enea; Jordan Sworen

(57) ABSTRACT

A personal transportation vehicle. The personal transportation vehicle provides an outer and inner shell having a rotor assembly supported between. The inner shell defines a compartment, which in turn houses an input system that controls an electromagnetic drive system. The electromagnetic drive system includes electromagnets that can generate a magnetic field. A sensor detects motion of the rotor assembly and stabilizes the inner shell. A controller controls states of each electromagnet depending on a position of the rotor assembly and an input from the input system. The electromagnets of the electromagnetic drive system cooperatively cause the personal transportation vehicle to move.

7 Claims, 3 Drawing Sheets

PERSONAL TRANSPORTATION VEHICLE

CROSS REFERENCE TO RELATED APPLICATION

This application claims the benefit of U.S. Provisional Application No. 62/474,335 filed on Mar. 21, 2017. The above identified patent application is herein incorporated by reference in its entirety to provide continuity of disclosure.

BACKGROUND OF THE INVENTION

Field of the Invention

The present invention relates to a personal transportation vehicle. More specifically, the present invention provides a personal transportation vehicle that is driven via sets of electromagnets disposed on internal and external rotating spheres.

Conventional vehicles pose risks to the vehicle occupants, pedestrians, and other vehicles and its occupants. These vehicles tend to be susceptible to mechanical failures and environmentally caused accidents. Roads covered with dust, rain, and snow limits the controls of the vehicle and can cause accidents that are otherwise avoidable. There is a need for a personal transportation vehicle that is controllable in an isolated environment, and an apparatus being controlled via an electromagnetic drive system.

Devices have been disclosed in the known art that relate to personal transportation vehicles. These include devices that have been patented and published in patent application publications. These devices in the known art have several known drawbacks.

In light of the devices disclosed in the known art, it is submitted that the present invention substantially diverges in design elements from the devices in the known art and consequently it is clear that there is a need in the art for an improvement to existing personal transportation vehicle devices. In this regard, the instant invention substantially fulfills these needs.

SUMMARY OF THE INVENTION

In view of the foregoing disadvantages inherent in the known types of personal transportation vehicle now present in the art, the present invention provides a new personal transportation vehicle wherein the same can be utilized for providing convenience for the user when traveling between locations.

It is therefore an object of the present invention to provide a new and improved personal transportation vehicle. The personal transportation vehicle comprises an outer shell concentric about an inner shell, and a rotor assembly supported therebetween. The inner shell defines a compartment, which in turn houses an input system configured to control an electromagnetic drive system. The electromagnetic drive system includes electromagnets configured to generate a magnetic field disposed on the outer, inner, and rotary shells/assemblies. A sensor is configured to detect motion of the rotor assembly and stabilize the inner shell and is operably connected to a controller. The controller is configured to alternate states of each electromagnet depending on a position of the rotor assembly and an input from the input system. The electromagnets of the electromagnetic drive system cooperatively cause the personal vehicle to move.

Another object of the present invention is to provide a personal transportation vehicle that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
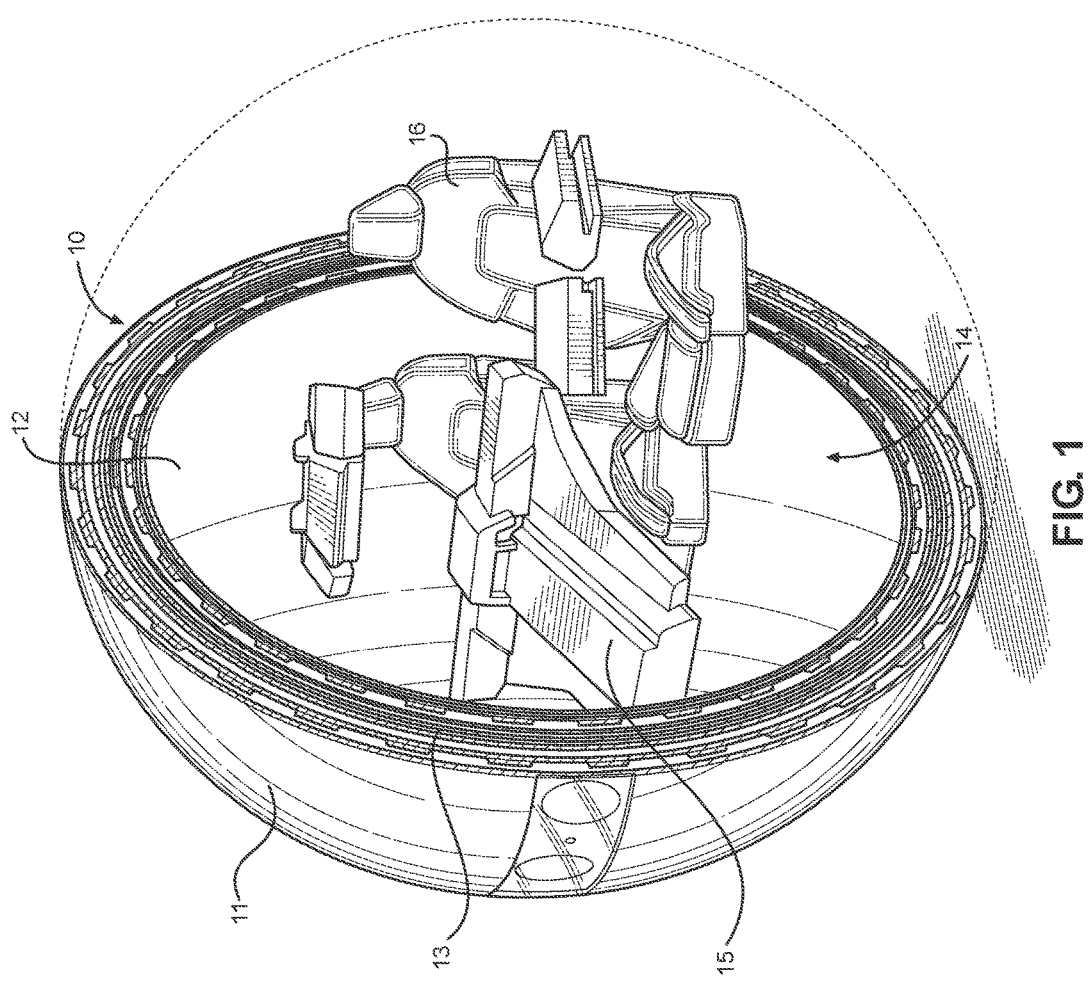
FIG. 1 shows a front perspective cut-away view of an embodiment of the personal transportation vehicle.

Reference is made herein to the attached drawings. Like reference numerals are used throughout the drawings to depict like or similar elements of the personal transportation vehicle. For the purposes of presenting a brief and clear description of the present invention, the preferred embodiment will be discussed as used for transporting persons across roads, fields, and the like. The figures are intended for representative purposes only and should not be considered to be limiting in any respect.

Referring to FIG. 1, there is shown a front perspective cut-away view of an embodiment of the personal transportation vehicle. The personal transportation vehicle 10 provides a powered vehicle that accommodates passengers within a spherical shell for omnidirectional movement. The personal transportation vehicle 10 includes an outer shell 11 concentric about an inner shell 12, wherein the inner shell 12 defines a compartment 14 therein. The compartment 14 is sized to accommodate at least one passenger and include a driver chair and display screen 16. In one embodiment, a door is disposed through the outer and inner shells 11, 12 to provide access to the compartment 14.

A rotor assembly 13 is disposed between the outer and inner shells 11, 12. In the shown embodiment, the rotor assembly 13 comprises one or more spherical shells concentric about the same central point as the outer and inner shells 11, 12. The rotor assembly 13 is disposed at a gap distance between each of the outer and inner shell 11, 12, and adjacent spherical shells of the rotor assembly 13. In one embodiment, the rotor assembly 13 is suspended at a uniform gap distance via electromagnets positioned on the outer and inner shells 11, 12 and the rotor assembly 13. In this way, each electromagnet is configured to cooperatively form a magnetic field that elevates the rotor assembly 13 between the outer and inner shells 11, 12.

Figure 2:
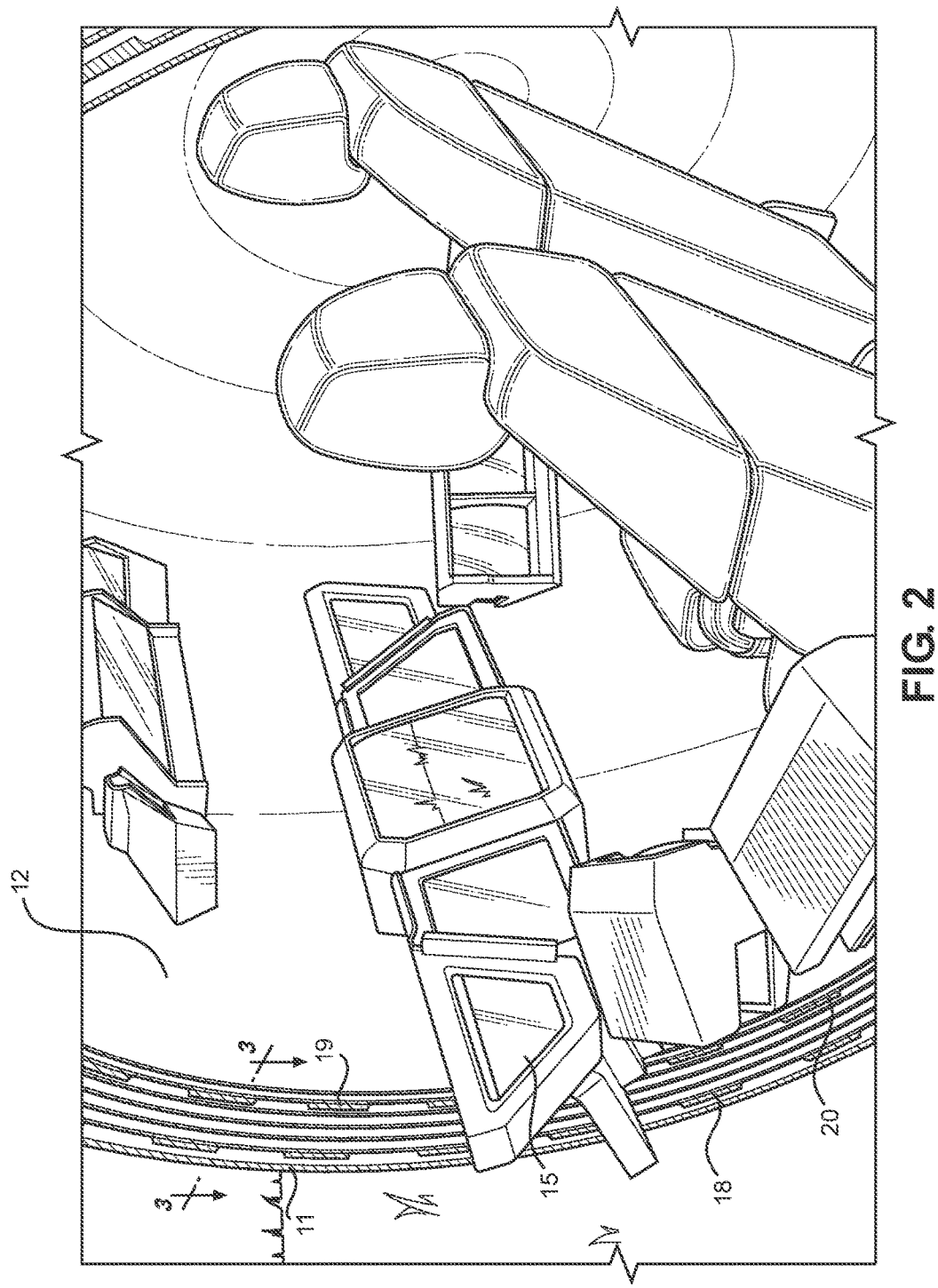
FIG. 2 shows a rear perspective cut-away view of an embodiment of the personal transportation vehicle.
Figure 3:
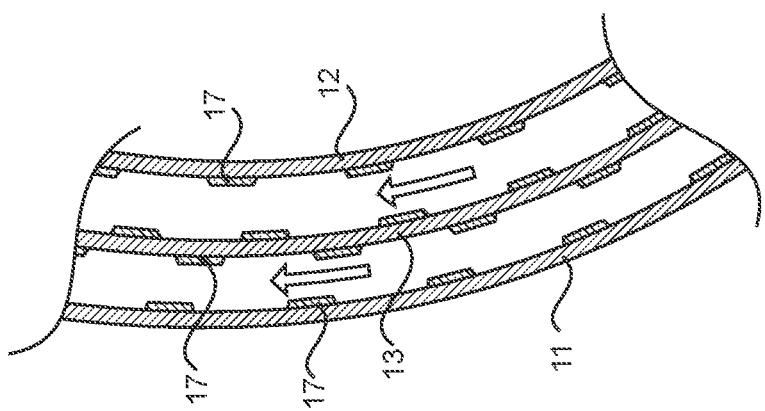
FIG. 3 shows a cross-sectional view of the outer shell, the inner shell, and the rotor assembly of an embodiment of the personal transportation vehicle taken along line 3-3 of FIG. 2.

Referring to FIGS. 2 and 3, there is shown a rear perspective cut-away view of an embodiment of the personal transportation vehicle and a cross-sectional view of the outer shell, the inner shell, and the rotor assembly of an embodiment of the personal transportation vehicle taken along line 3-3 of FIG. 2, respectively. The personal transportation vehicle includes an electromagnetic drive system that drives and controls the movement thereof. The electromagnetic drive system includes the electromagnets 17, a sensor configured to detect motion of the rotor assembly 13, including the position, velocity, direction, and acceleration of each of the outer and inner shells 11, 12 and the rotor assembly 13 of the personal transportation vehicle.

In the shown embodiment of FIG. 2, the inner shell 12 forms a compartment 14 therein, wherein the compartment includes a seat and input system 15. The input system 15 is configured to direct a controller, and in turn control the electromagnets 17. In one embodiment, the controller alternates states of each electromagnet 17 depending on input from a sensor configured to detect motion of the rotor assembly 13.

The rotation of the rotor assembly 13 via the electromagnetic drive system causes the personal transportation vehicle to move along a ground surface. For example, in one embodiment, the rotor assembly 13 is being spun about a single axis causing the outer shell 11 to rotate thereabout. The sensor provides motion information related to the shells 11, 12 and the rotor assembly 13 to a controller, wherein the controller and input determine a state of each electromagnet configured to generate a magnetic field. Input is sent to the controller wherein the sets of electromagnets cooperatively cause the personal vehicle to move.

Referring specifically to FIG. 3, the electromagnets 17 are divided into sets disposed on the outer shell 11 and the inner shell 12 comprising a first set and a second set of the electromagnets disposed thereon, respectfully. In some embodiments, disposed on a face thereof. In addition, the rotor assembly 13 also comprises a sphere having a third set of electromagnets 17 disposed thereon. In one embodiment, the controller alternates states of each electromagnet 17 depending on input from a sensor configured to detect motion of the rotor assembly 13. For example, the electromagnets 17 of the inner shell 12 repel the electromagnets 17 of the rotor assembly 13 when the electromagnets 17 of the rotor assembly 13 are positioned forward and offset from the adjacent electromagnets 17 of the inner shell 12. In this way, the rotor assembly 13 is forced in a desired direction about the inner shell 12.

In one embodiment, the rotor assembly 13 includes more than one spherical shell that independently spin. The more than one spherical shell provides for increased control of the personal transportation vehicle 10 as the movement thereof may be finely adjusted with changes in speed and direction of each spherical shell of the rotor assembly 13.

Figure 4:
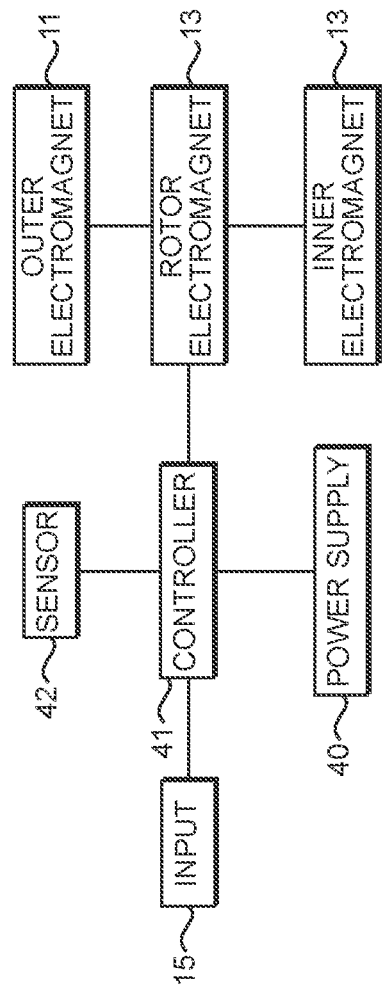
FIG. 4 shows a block diagram of the components of an embodiment of the personal transportation vehicle.

Referring to FIG. 4, there is shown a block diagram of the components of an embodiment of the personal transportation vehicle. A power supply 40 is operably connected to the electromagnetic drive system and the input system 15. In one embodiment, the power supply 40 is a rechargeable battery that is housed within the compartment. Alternatively, the power source 40 may include solar and the like. The controller 41 receives input from the input system 15 and causes movement of the rotor assembly 13 and outer shell 11 via the electromagnets disposed thereon. The inner shell 12 may be gyroscopically stabilized via a sensor 42 in a fixed orientation, wherein a user within the compartment remains stable therein. The personal transportation vehicle provides for omnidirectional movement of a user across a variety of surfaces.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A personal transportation vehicle, comprising:
    an outer shell concentric about an inner shell, a rotor assembly supported therebetween;
    the inner shell defining a compartment and an input system, the input system configured to direct a controller;
    an electromagnetic drive system comprising:
        an electromagnet configured to generate a magnetic field;
        the outer shell and the inner shell comprising a first set and a second set of the electromagnets disposed thereon, respectfully;
        the rotor assembly comprising a sphere having a third set of electromagnets disposed thereon;
        a sensor configured to detect motion of the rotor assembly;
        the controller configured to alternate states of each electromagnet depending on a position of the rotor assembly and an input from the input system;
    wherein the sets of electromagnets cooperatively cause the personal vehicle to move;
    a power supply operably connected to the electromagnetic drive system and the input system.

2. The personal transportation vehicle of claim 1, wherein the rotor assembly comprises a single spherical shell.

3. The personal transportation vehicle of claim 1, wherein each electromagnet of the sets of electromagnets are disposed on a face thereof.

4. The personal transportation vehicle of claim 1, wherein the motion includes position, velocity, acceleration, and direction rotational information.

5. The personal transportation vehicle of claim 1, wherein the compartment further comprises a chair and display screen.

6. The personal transportation vehicle of claim 1, wherein the compartment configured to remain fixed on a vertical axis independent of the rotor assembly.

7. The personal transportation vehicle of claim 1, wherein the rotor assembly comprises a plurality of spherical rotor shell, wherein each spherical rotor shell moves independent of adjacent spherical rotor shell.

* * * * *